US009509553B2

(12) United States Patent
Levy et al.

(10) Patent No.: US 9,509,553 B2
(45) Date of Patent: Nov. 29, 2016

(54) SYSTEM AND METHODS FOR MANAGEMENT VIRTUALIZATION

(75) Inventors: Tomer Levy, Kfar-Saba (IL); Shimon Hason, Brookline, MA (US); Oran Epelbaum, Givat Shmuel (IL)

(73) Assignee: INTIGUA, INC., Newton, MA (US)

( * ) Notice: Subject to any disclaimer, the term of this patent is extended or adjusted under 35 U.S.C. 154(b) by 488 days.

(21) Appl. No.: 13/572,740

(22) Filed: Aug. 13, 2012

(65) Prior Publication Data
US 2014/0047439 A1   Feb. 13, 2014

(51) Int. Cl.
*G06F 9/455* (2006.01)
*H04L 12/24* (2006.01)
*H04L 29/08* (2006.01)
*G06F 9/445* (2006.01)
*H04L 12/26* (2006.01)

(52) U.S. Cl.
CPC ............. *H04L 41/048* (2013.01); *H04L 67/34* (2013.01); *G06F 8/61* (2013.01); *G06F 9/44505* (2013.01); *H04L 41/0893* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 7,136,857 B2* | 11/2006 | Chen | ........................ | G06F 8/60 |
| 7,647,589 B1* | 1/2010 | Dobrovolskiy | ..... | G06F 11/3644 710/260 |
| 7,865,546 B1* | 1/2011 | Tuzhilin | .............. | H04L 12/6418 709/202 |
| 8,225,317 B1* | 7/2012 | Chiueh | .................... | G06F 9/455 713/164 |
| 8,910,155 B1* | 12/2014 | Sobel | ...................... | G06F 17/30 713/164 |
| 2005/0276228 A1* | 12/2005 | Yavatkar | ................... | H04J 3/14 370/242 |
| 2006/0048133 A1* | 3/2006 | Patzachke | ................ | G06F 8/65 717/168 |
| 2006/0112342 A1* | 5/2006 | Bantz | ....................... | G06F 21/50 715/736 |
| 2006/0230456 A1* | 10/2006 | Nagabhushan | ......... | H04L 69/12 726/25 |
| 2007/0050426 A1* | 3/2007 | Dubal | ....................... | G06F 8/65 |
| 2007/0192400 A1* | 8/2007 | Lee | ..................... | G06F 11/0709 709/202 |
| 2007/0237080 A1* | 10/2007 | Savagaonkar | ...... | H04L 63/1416 370/235 |
| 2007/0239884 A1* | 10/2007 | Karmakar | ............... | H04L 67/26 709/232 |
| 2008/0134175 A1* | 6/2008 | Fitzgerald | ........... | G06F 9/45533 718/1 |
| 2008/0222457 A1* | 9/2008 | Ertel | ................... | G06F 11/3672 714/47.1 |
| 2008/0229319 A1* | 9/2008 | Marchand | ............. | G06F 9/4856 718/104 |
| 2008/0288212 A1* | 11/2008 | Greifeneder | ........ | G06F 11/3466 702/182 |
| 2008/0288962 A1* | 11/2008 | Greifeneder | ............. | G06F 8/00 719/317 |

(Continued)

*Primary Examiner* — Emerson Puente
*Assistant Examiner* — Mehran Kamran
(74) *Attorney, Agent, or Firm* — Pearl Cohen Zedek Latzer Baratz LLP

(57) ABSTRACT

A method of executing an original agent application as a virtual agent, the method comprising encapsulating an original agent in a container file to produce a virtual agent; providing the virtual agent to an endpoint machine; and executing the virtual agent, within the container, on the endpoint machine.

14 Claims, 4 Drawing Sheets

(56) References Cited

U.S. PATENT DOCUMENTS

| | | | |
|---|---|---|---|
| 2009/0007100 A1* | 1/2009 | Field | G06F 21/53 718/1 |
| 2009/0106263 A1* | 4/2009 | Khalid | G06F 17/30115 |
| 2009/0165132 A1* | 6/2009 | Jain | G06F 21/51 726/22 |
| 2009/0241109 A1* | 9/2009 | Vandegrift | G06F 9/445 718/1 |
| 2009/0293056 A1* | 11/2009 | Ferris | G06F 9/5077 718/1 |
| 2009/0328030 A1* | 12/2009 | Fries | G06F 8/63 717/174 |
| 2010/0131956 A1* | 5/2010 | Drepper | G06F 9/5011 718/104 |
| 2010/0138815 A1* | 6/2010 | Schneider | G06F 8/41 717/141 |
| 2010/0199351 A1* | 8/2010 | Protas | G06F 21/577 726/25 |
| 2010/0306764 A1* | 12/2010 | Khanna | G06F 11/1482 718/1 |
| 2011/0107331 A1* | 5/2011 | Evans | H04W 4/003 718/1 |
| 2011/0131183 A1* | 6/2011 | Chandhok | G06F 11/1458 707/634 |
| 2011/0167473 A1* | 7/2011 | Evans | G06F 9/45541 726/1 |
| 2011/0208797 A1* | 8/2011 | Kim | G06F 21/554 709/202 |
| 2011/0225624 A1* | 9/2011 | Sawhney | G06F 21/53 726/1 |
| 2011/0247075 A1* | 10/2011 | Mykland | G06F 21/10 726/26 |
| 2011/0321166 A1* | 12/2011 | Capalik | H04L 63/1491 726/25 |
| 2012/0066681 A1* | 3/2012 | Levy | G06F 9/5027 718/1 |
| 2012/0304172 A1* | 11/2012 | Greifeneder | G06F 9/45504 718/1 |
| 2013/0117863 A1* | 5/2013 | Mykland | G06F 21/10 726/29 |
| 2013/0139173 A1* | 5/2013 | Carter | G06F 11/3419 718/104 |
| 2013/0152076 A1* | 6/2013 | Patel | G06F 9/45558 718/1 |
| 2013/0239109 A1* | 9/2013 | Ferwerda | G06F 9/5027 718/1 |
| 2013/0254768 A1* | 9/2013 | Wipfel | H04L 9/3213 718/1 |
| 2013/0347095 A1* | 12/2013 | Barjatiya | H04L 63/0209 726/13 |
| 2014/0006480 A1* | 1/2014 | Dobrev | H04L 67/42 709/203 |
| 2014/0095945 A1* | 4/2014 | Sankaran | G06F 11/0754 714/51 |

* cited by examiner

SYSTEM AND METHODS FOR MANAGEMENT VIRTUALIZATION

BACKGROUND OF THE INVENTION

With development of computing systems, management of large scale software installations has become a challenging task. Modern computing systems may involve distributed software modules and/or applications, e.g., in an organization, community or data center. Management and maintenance of large scale and/or distributed software applications or systems typically involve tasks such as update procedures, monitoring, version control etc. For example, management of software installations in an organization may include updating software modules or monitoring various aspects on a large number of servers and/or user computers.

In another example, management of a virtual machine (VM) environment may involve management of a large number of virtual machines. The term "virtual machine" (VM) generally refers to an isolated operating system (also referred to as a "guest operating system") that runs on a physical machine. A VM may be a software implementation of a machine (e.g., a computer) that executes programs as if it were a physical computer, having its own resources, e.g., a central processing unit (CPU), memory (e.g., random access memory (RAM)), hard disk and network interface cards (NICs).

A number of VMs may be (and typically are) executed on a single hardware machine. For example, a number of different operating systems (e.g., Windows™, Unix™ and Mac OS™) may run on a single hardware machine. One of the essential characteristics of a VM is that applications, programs or services running inside a VM are limited to (or by) the resources provided by the VM. Accordingly, VM technology offers a number of advantages. For example, consolidation may be realized by utilizing a single hardware server in order to execute a number of operating systems. Other advantages may be redundancy and fail over.

However, management of large scale computing, software and/or VM systems may pose a number of challenges. For example, various services (e.g., backup, monitoring and/or software updates, security, compliance, configuration management, inventory management, software distribution, etc.) may need to be managed and/or performed for, or even on, each computer in an organization or on each VM installed on a single computer or on a number of hardware machines.

Additionally, agent software needs to be installed, upgraded, configured and monitored for failures. Once a failure occurs, a troubleshooting process which is often manual is required. In addition, monitoring for agent application resource consumption is required and when needed, resolving of excessive resource consumption. All these management services are performed very often by distributed computing software compromising servers and agent on each endpoint.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

DETAILED DESCRIPTION OF EMBODIMENTS OF THE INVENTION

Figure 1:
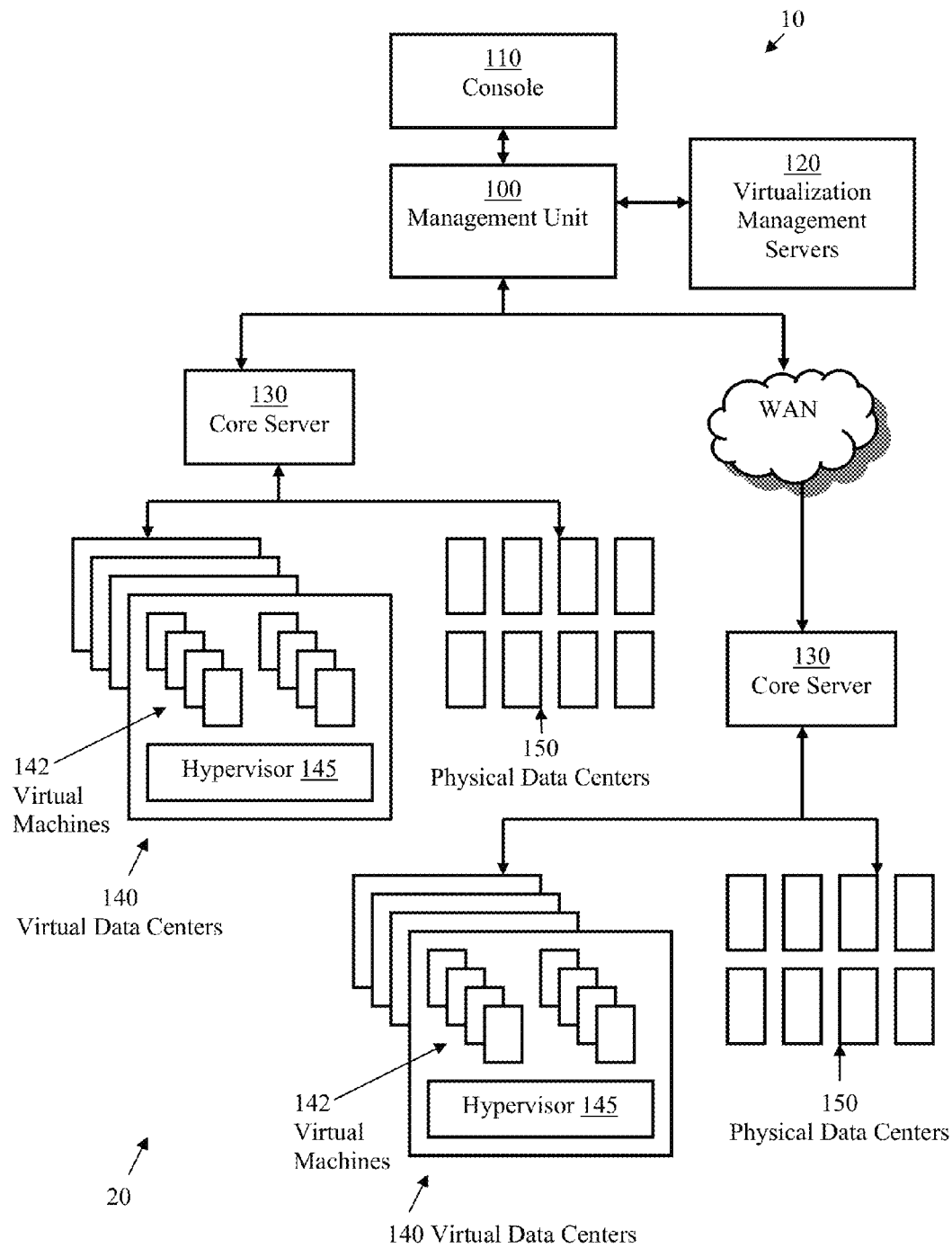
FIG. 1 is a schematic illustration of a system for datacenters environment management according to embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention may provide a system and method for management of a system such as, for example, datacenter, private, hybrid or public cloud, in an environment of virtual and physical machines, by virtualized management agents. Original management agents such as for monitoring, backup, performance, antivirus, compliance, automation, security, configuration, and/or other agents may be virtualized and/or run virtually on machines, for example remote machines, for example machines that may be included in datacenters environment. A system according to embodiments of the present invention may control a virtual infrastructure of virtual agents that may run virtually on machines in the datacenters environment. The execution of the virtual agents may be done based on pre-defined policies. Embodiments of the present invention may provide system management based on virtual agents without the requirement to install and configure agents on each machine. This may save, for example, time and operational overhead costs so as shortening time to market, improve and protect application performance and uptime, and ensure and simplify compliance.

An endpoint machine may be running on any available Operating System, for example: Windows® 2000, Windows® 2003, Windows® 2008, Linux® from multiple distributions, Unix®, HP-UX®, AIX® etc. These Operating Systems may be of 16 bit architecture, 32 bit architecture and 64 bit architecture.

Additionally, a system and method according to embodiments of the present invention may monitor, for example continuously, activity of virtual agents. Embodiments of the present invention may enable controlling of consumption of resources across the infrastructure of virtual agents and thus, for example, enable optimization of application performance.

In some embodiments of the present invention, tracking and/or management of the entire virtual management infrastructure may be performed from one central console.

Although a virtual agent as described herein may function and behave as if it was installed on each machine, the operation or execution of a virtual agent may be decoupled from the underlying operating system. Otherwise described, an agent may be executed on a machine (physical or virtual machine) without being installed on the machine as done in prior art systems and methods.

Virtually executing virtual agents instead of installing agent software on thousands of machines may drastically cut down agent management overhead. For example, agent upgrade processes may include a simple replacing of a file on the endpoint machine and/or may be performed, according to embodiments of the invention, for example, with a mouse click or other command/input by an input device from a user. Other operations, e.g., rebooting, scripting, logging on and off servers, coordinating change management windows, testing for agent conflicts and manual installations when scripting tools fail may all be avoided using embodiments of the invention. In an embodiment, user defined policies may control virtual agents operation or deployment, e.g., in order to proactively optimize application performance and avoid agent storms.

Reference is now made to FIG. 1, which is a schematic illustration of a system 10 for datacenters environment management according to embodiments of the present invention. System 10 may manage datacenters 140 and 150 in an environment 15 of virtual and physical data centers 140 and 150. Data centers 140 and 150 may include endpoint virtual and/or physical machines that may be managed by virtual agents. As discussed in detail below, embodiments of the present invention may enable execution of virtual agents at endpoint machines by containers such as, for example, package files that include the virtual agents, without a requirement to install the virtual agents in the endpoint machines. System 10 may include a management unit 100, a console 110, virtualization management servers 120 and core servers 130. A container may include a plurality of virtual agents, and the plurality of virtual agents may be executed within a single container file, on the endpoint machine.

Management unit 100 may manage console 110, virtualization management server 120 and the virtual environment including infrastructure of virtual agents and/or virtual machines, for example endpoint machines. Management unit 100 may store images of the virtual agents, policies to control the virtual agents, data about the virtual infrastructure of virtual agents and/or virtual machines, data about the physical infrastructure of environment 15 and/or any other data that may be required, for example in order to manage the virtual infrastructure of virtual agents. In some embodiments, a virtual agent may be automatically joined to the managed environment upon executing the virtual agent on the endpoint machine and automatically disjoining the virtual agent from the managed environment upon removing the endpoint machine from an installation in environment 15.

Console 110 may enable a user to control and manage system 10 via management unit 100. Console 110 may enable users to view, monitor, define and manage system 10 and environment 15 from console 110, for example by a graphical user interface such as, for example, a dashboard, for example displayed on a display (not shown), that may be included in console 110. A user may control and input commands to console 110 by any interface and/or input device such as a keyboard, a mouse, a touch screen, a virtual pen and/or by any other suitable manner.

Management unit 100 may enable a user to create a library of virtual agents. Management unit 100 may convert original agent installers, which may be uploaded to management unit 100 by a user, into virtual agents. The virtual agents may be stored, for example, in a designated storage library in management unit 100. As described in more detail below, the virtual agents may be encapsulated in a virtual agent container (may also be called package), which may include in addition to the virtual agent a configuration for execution of the virtual agent at the endpoint machine, for example without installing the virtual agent in the endpoint machine. A virtual agent container file may include and/or wrap one or more virtual agents, for example multiple virtual agents and their configurations.

Virtualization management servers 120 may include any third-party software for management of virtual machines. Any number of virtualization management servers 120 may be included in system 10 and the invention is not limited in this respect.

Core servers 130 may push the virtual agent container file to relevant endpoint machines, for example upon a command received from a user. Upon such command, management unit 100 may share container files with core servers 130, which may push the container files to relevant endpoint machines. Virtual datacenters 140 may be managed by hypervisors 145. Communication between core servers 130 and virtual endpoint machines 142 may be facilitated through hypervisor 145, for example without the need for direct network connectivity between core servers 130 and endpoint virtual machines 142. Physical endpoint machines and virtual endpoints 142 may communicate with core servers 130 by standard network connections. Any number of core servers 130 and any number of datacenters 140 and 150 may be included and the invention is not limited in this respect. Each core server 130 may support up to about 2500 virtual agents. Each management unit 100 may support and/or manage a number of core servers 130 according to the number of virtual agents in the datacenters environment.

Core servers 130 may further enable controlling the virtual agents executed at the endpoint machines inside the container, e.g. not installed on the operating system. The execution of the virtual agents at the endpoint machines inside the container may be decoupled from the operating system of the endpoint machine such as, for example, the management, virtual deployment, upgrades, downgrades, troubleshooting and termination of the virtual agents may be performed in the container independently from the operating system. Components of the container may monitor processes performed by a virtual agent, detect failures and/or remedy failures in the operation of the virtual agent, for example in real time. Additionally, components of the container may communicate with hypervisor 145 and/or coordinate operations with operations performed by other virtual agents, for example in other virtual endpoint machine supervised by the same hypervisor 145. The coordination may resolve and/or prevent performance bottlenecks. Management actions performed by modules/components of the container may be executed based on policies stored in the container and/or in management unit 100, which may be predefined or defined during operation, for example by a user. By decoupling execution of agents from the operating system in the described manners, users may save time and risk of agent deployments, upgrades and troubleshooting.

Figure 2:
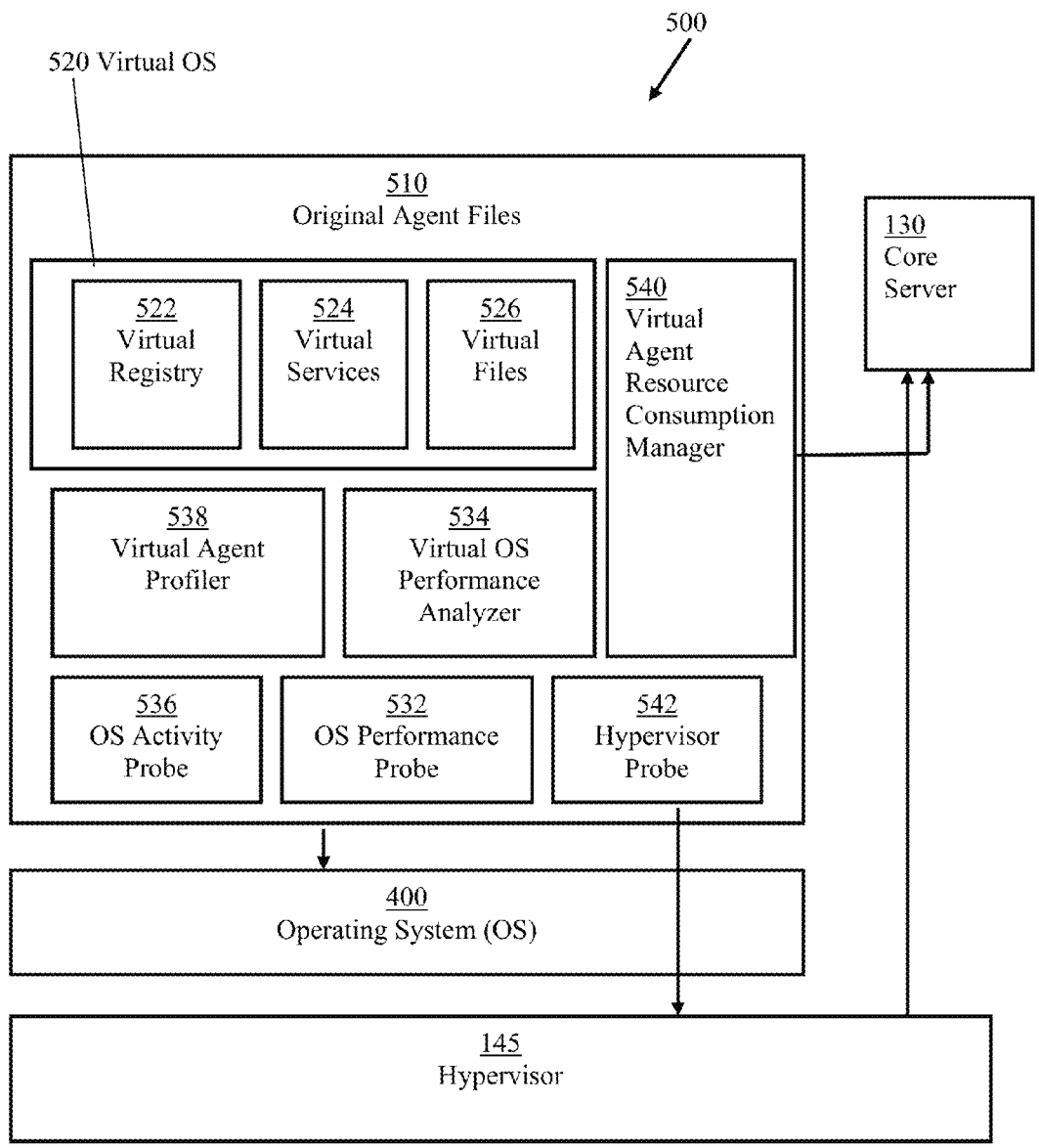
FIG. 2 is a schematic illustration of a virtual agent container according to embodiments of the present invention.

Reference is now made to FIG. 2, which is a schematic illustration of a virtual agent container 500 according to embodiments of the present invention. Container 500 may constitute a package or a "sandbox" that may include agent files 510 together with a virtual operating system (OS) 520 and other components as described herein. Container file 500 may be, for example, a .vai file encapsulating the original agent files 510, which may include all the components of the original agent such as an executable file, DLL files, registry files, configuration files and/or any other components of the original agent. In addition, container 500 may include components which enable the virtual agent to function without being installed on the local operating system (OS) 400 of the endpoint machine. In addition container 500 may include additional configurations such as, for example, relation of the virtual agent to endpoint machines and additional configurations that may be configured for each virtual agent or for a group of virtual agents. As described herein, a user may configure these parameters for each virtual agent and, for example, may create templates of such configurations on console 110.

Virtual OS 520 may enable container 500 to create a logical separation between the operating system of the endpoint machine and the virtual agent processes. The container may be configured to isolate the execution of the virtual agent from the operating system executed on the endpoint machine. According to some embodiments isolation of the execution of the virtual agent may include at least one of: encapsulating substantially all configurations related to the virtual agent into the container file, monitoring, by the container, resources used by the virtual agent, intercepting, by the container, system requirements made by the virtual agent, and enforcing constraints on an execution of the virtual agent according to a policy. The virtual agent may be fully controlled within container 500 and may function without using the registry or services of the endpoint machine. Once an agent is executed within the container, virtual OS 520 manages the system requirements of the execution, intercepts system requirements made by the virtual agent and/or redirects some system requirements to the virtual registry/file/service and some to the local OS 400 of the endpoint machine. Virtual OS 520 may include a virtual registry 522, virtual services 524 and virtual files 526. Container 500 may further include an OS performance probe 532, a virtual OS performance analyzer 534, an OS activity probe 536, a virtual agent profiler 538, a virtual agent resource consumption manager 540 and hypervisor probe 542.

Container 500 may enforce performance constraints determined by predefined policies. OS performance probe 532 may monitor performance, load and condition of the local OS 400. Virtual OS performance analyzer 534 may detect consumption of resources of virtual OS 520. Virtual OS performance analyzer 534 may compare and/or balance the resource consumption of virtual OS 520 and the local OS 400 resource consumption, monitored by OS performance probe 532. Based on the comparison, virtual OS performance analyzer 534 may decide when to decrease or increase the activity speed of a virtual agent, for example in order to comply with a performance policy of this virtual agent. In case a virtual agent exceeds the allowed consumption of resources according to the policy, virtual OS performance analyzer 534 may notify virtual agent resource consumption manager 540. Virtual agent resource consumption manager 540 may decrease or increase the activity speed of a virtual agent to fit the required resource consumption. Virtual agent resource consumption manager 540 may intercept and throttle down specific system calls made by the virtual agent in relation to the source of contention. It may for example, be alerted of a CPU contention and throttle down CPU intensive system calls. It may also be alerted of I/O contention and therefore detect I/O intensive system calls and throttle them down. Another example is that the virtual agent resource consumption manager 540 may also be alerted of memory shortage on the OS level and memory overconsumption in the virtual agent and it may decide to limit memory consumption or to stop one or more processes of the virtual agent.

Container 500 may also enforce performance constraints determined by predefined policies on operating systems services. For example, during a backup significant resources may be consumed by a Volume Shadow Service (VSS) or daemon. The virtual agent resource consumption manager 540 may intercept and throttle down such services.

Virtual agent resource consumption manager 540 may receive commands from virtual OS performance analyzer 534 or from core server 130 to throttle activity of a virtual agent, e.g. slow down the activity speed of a virtual agent in order to consume less computing power, produce less intense input-output activity and/or otherwise reduce consumption of resources.

Hypervisor probe 542 may provide virtualization awareness in the sense described herein. Hypervisor probe 542 may communicate with hypervisor 145 and/or coordinate operations with operations performed by other virtual agents, for example in other virtual endpoint machine supervised by the same hypervisor 145. The coordination may resolve and/or prevent performance bottlenecks. Hypervisor probe 542 may be able to collect performance information from the host virtual machine (the virtual machine on which the virtual agent is applied) and from other virtual machines supervised by the hypervisor 145 such as CPU consumption, Input/Output load memory utilization and/or any other required performance data.

OS activity probe 536 may detect malfunctions on the local OS 400, such as a non-responsive or shut OS service, which may harm the functioning of the virtual agent. Virtual agent profiler 538 may estimate average and maximum resource consumption of a virtual agent, so that the real resources consumption by the virtual agent may be assessed by a user.

Figure 3:
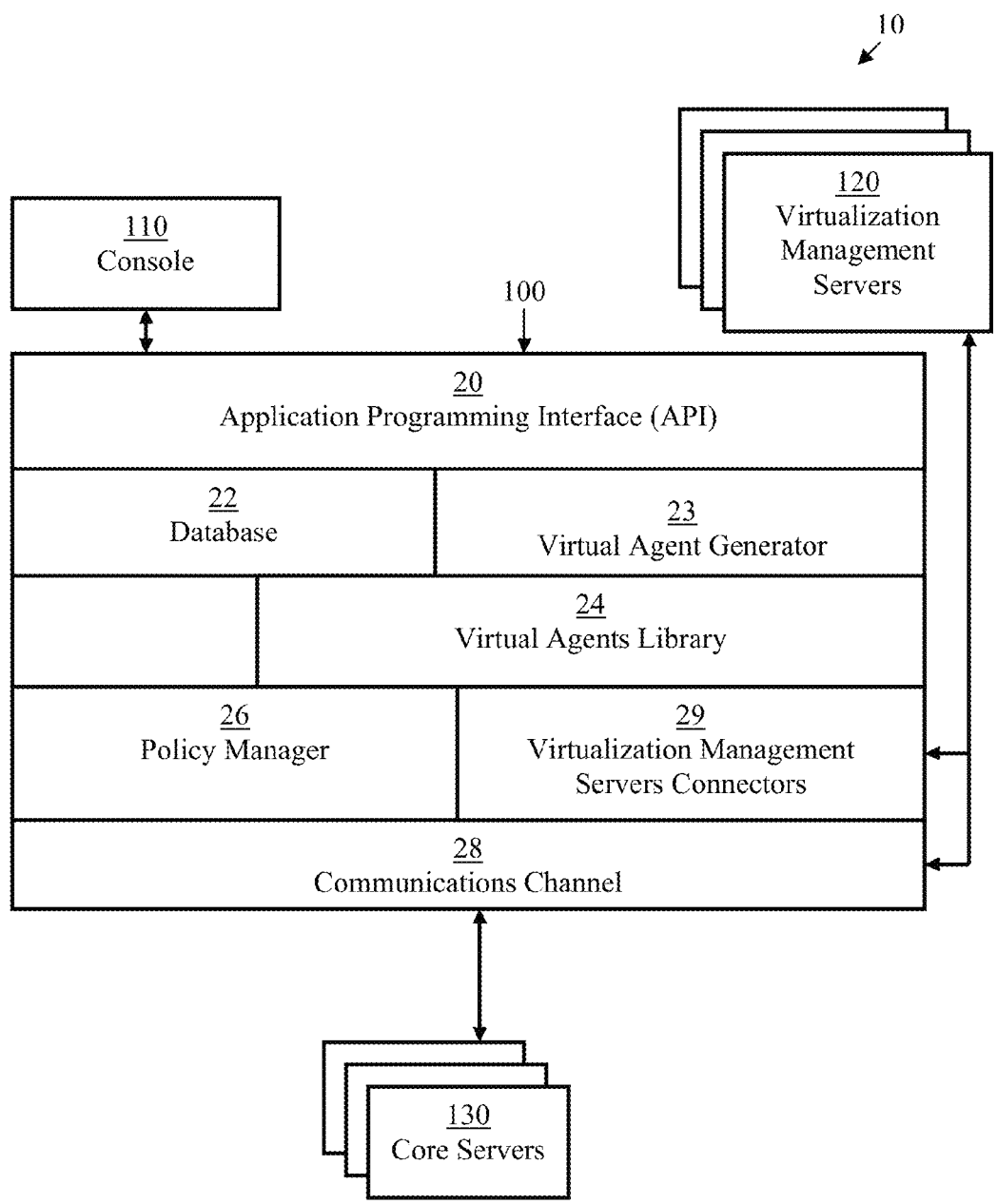
FIG. 3 is a schematic illustration of a system for datacenters environment management according to embodiments of the present invention.

Reference is now made to FIG. 3, which is a schematic illustration of a system 10 for datacenters environment management according to embodiments of the present invention, which shows management unit 100 in more detail. Management unit 100 may include an Application Programming Interface (API) 20, a database 22, a virtual agents generator 23, a virtual agents library 24, a policy manager 26, communications channel 28 and virtualization management servers connectors 29. Management unit 100 may also include and/or interface with console 110 described above, by which a user may monitor and manage system 10. Console 110 may include a graphical user interface that may communicate with management unit 100 via application programming interface 20, by which a user may view, monitor and manage system 10.

Management unit 100 may act as a central management server for deployment, configuration, auditing and/or performing any other suitable operation for supervision and/or execution of virtual management agents across the datacenters supervised by management unit 100. Management unit 100 may constitute a management center for management of multiple virtualization management servers 120 and multiple physical and virtual datacenters via core servers 130. Virtualization management servers connectors 29 may include a plug-in mechanism to integrate with virtualization management servers 120, which may be, for example, third party virtualization management servers such as VMware vCenter®, Microsoft® Hyper-V Management™ Server, Oracle® Virtualization, Citrix® Xen, KVM, Virtual Box, Parallels, Linux Containers, Linux zones, Red Hat® Enterprise Virtualization and/or any other suitable virtualization management servers. Communications with core servers 130 may be performed via communications channel 28.

A user may log in to management unit 100 via a web browser, and then the user may configure and monitor system 10 by the graphical user interface on console 110. Once a user applies settings and configurations to system 10, the management unit 100 may process the settings and configurations and send the relevant commands to core servers 130. Core servers 130 may interact, via a hypervisor or directly, with virtual and/or physical endpoint machines to apply the settings and commands. Via console 110, a user may apply settings and configurations to specific servers, datacenters or machines, or may apply a policy, e.g. a set of automatic rules for setting and/or configuring a group of servers, datacenters or machines. For example, a user may determine which virtual agents should be applied to which servers, datacenters or machines. For example, a user may determine management policies for cases of virtual agent failure of an operating system failure. For example, a user may determine performance requirements such as memory, computing power and/or bandwidth consumption and/or any other suitable performance requirements for virtual agents. Policy manager 26 may compile management policies and may apply corresponding tasks to the relevant core servers 130, which may apply the tasks on the relevant endpoint machines. Additionally or alternatively, a user may partially or fully automate management unit 100 by developing and integrating software into management unit 100, for example by a software development kit (SDK) that may be included in management unit 100. Policies applied by a user and/or by policy manager 26 may include, for example, deployment policies for deployment of virtual agents, performance protection policies and proactive management policies.

Proactive management policies applied by a user via console 110 may include policies for troubleshooting problems such as, for example, errors in the original agent, errors in the configuration, errors in a virtual agent process, errors due to external factors and/or interferences and/or any other problem that may occur. Management unit 100 may detect virtual agent failures and/or errors, for example, via core servers 130. Management unit 100 may cure the detected problems according to pre-defined policies of troubleshooting by a user. A predefined troubleshooting policy may include, for example, restarting a virtual agent, restarting an OS service (such as a Windows Management Instrumentation (WMI)) and/or any other suitable policy. Additionally, when problems occur, management unit 100 may send to console 110 alerts that may console 110 may be displayed and/or sounded for a user to be notified.

Deployment policies applied via console 110 may apply specific virtual agents to certain types of endpoint machines. These policies may be dynamic, such that when a virtual machine of a certain type joins the environment, predetermined agents for this type of virtual machines may be applied to this virtual machine automatically, e.g. without any further user involvement. For greater control, the user may instruct that a personal approval will be required before certain operations and/or implementations.

By console 110 the user may define deployment policies to schedule and control the virtual agents deployments in endpoint machines. Users may define in policies which virtual agents and which versions are to be applied to which servers/machines groups/types. Performance protection policies applied via console 110 may control virtual agents resource consumption including CPU, Memory and Input/Output performance, for example to protect applications from excessive resource consumption. Performance thresholds determined by performance protection policies may be included in the virtual agent container.

By hypervisor probe 542 and resource consumption manager 540, real-time performance statistics from operating systems of endpoint machines and from hypervisors may be collected and combined, which may enable accurate monitoring of resource consumption across the datacenters in the virtual environment of virtual agents and virtual machines. In case it is detected by virtual OS performance analyzer 534 that the resource consumption of a virtual agent exceeds the pre-defined thresholds as determined in the policy, virtual agent resource consumption manager 540 may throttle down the resource consumption of the virtual agent or may reschedule the activities of the virtual agent in order to free up sufficient resources for the application to meet the policy requirements. Policy parameters may be changed by a user at any time via console 110. The change may be pushed, for example automatically upon a command from a user to the relevant virtual agents.

In order to manage virtual agents by console 110, a user may be required to enter identification such as, for example a user name and password, which may be stored, for example, encrypted, in database 22. Access to virtual agents may be provided according to authorizations of a specific user. Additionally, communications between core server 130 and management unit 100 may be authenticated and/or encrypted (such as by SSL certificates).

Once executed at an endpoint machine, within container 500, the virtual agents are independent in the sense they may continue functioning even if core server 130 and/or management unit 100 fail. In such case, management features such as version changes of the virtual agent may be disabled until core server 130 and/or management unit 100 function. Both server 130 and/or management unit 100 may be restarted upon failure.

Console 110 may include an uninstall feature, which may uninstall and/or halt operation of the managed virtual agents and/or may restart corresponding non-virtual agents if such are installed in the endpoint machine. The uninstall feature may uninstall the managed virtual agents from virtual endpoint machines also when the virtual endpoint machines are turned off.

Database 22 may store data about servers, datacenters and/or endpoint machines, data about virtual agent container, associations between servers, datacenters and/or endpoint machines and virtual agent container and management policies data. In addition, database 22 may store events and logs generated by endpoint machines. Database 22 may include a relational database to relate data about endpoint machines 142 with data about virtual agents. Data about endpoint machines 142 may include name, Internet Protocol (IP) address, operating system in use, and/or any additional suitable data. Database 22 may also collect and/or store events and logs from endpoint machines, process the events and logs and generate reports, for example upon a user's request or periodically. The generated reports may be in a fully searchable format.

For example, database 22 may generate audit reports, reports about endpoint machines, excessive resource consumption events, virtual agent predicted performance and/or any other report based on data collected and/or stored in database 22. Audit reports generated by database 22 may include logs of changes in the managed environment, including the time and user identification. Reports about endpoint machines may present endpoint machines in the managed environment that are managed or not managed by management unit 100. In some embodiments, any endpoint machine in the environment may be automatically controlled and/or manageable by management unit 100. In some embodiments, an endpoint machine in the managed environment may be unmanageable by management unit 100 because of a problem, error or failure that may be solved by a troubleshooting policy or by a user through console 110. Reports about endpoint machine may enable a user to identify such problems and solve them. Reports about excessive resource consumption events may constitute an events log and/or present, for example, events that triggered excessive resource consumption by virtual agents. The report may also present data about initiated proactive actions for moderating these events, for example by management unit 100. Reports about virtual agent predicted performance may predict resource consumption by virtual agents before pushing virtual agents to endpoint machines. For example, management unit 100 may detect that a particular virtual agent will consume a lot of memory. As a result, management unit 100 and/or the user may compute that a certain number and/or percentage of machines may experience memory shortage.

As described above, management unit 100 may enable a user to create a library of virtual agents, for example by virtual agents generator 23. Virtual agents generator 23 may convert original agent installers, which may be uploaded to management unit 100 by a user, into virtual agents. The virtual agents may be stored, for example, in virtual agents library 24 in management unit 100. The virtual agents may be encapsulated in a virtual agent container, which may include in addition to the virtual agent a configuration for execution of the virtual agent at the endpoint machine, for example without installing the virtual agent in the endpoint machine. Virtual agents library 24 may store, in addition to the converted virtual agents, configuration of the virtual agents for execution on endpoint machines, for example as configured by a user. The virtual agents together with corresponding configurations may be included in virtual agent container files, which may be stored in virtual agents library 24. As described herein, a virtual agent container file may be pushed to an endpoint machine by core server 130, for example upon a command by a user, for example to apply a virtual agent container to a target server or virtual machine. Then, the virtual agent container may be executed at the endpoint machine from within the container without being installed on the endpoint machine.

As discussed above, system 10 and the virtual agents may be monitored and managed through console 110, including a dashboard and/or a graphical user interface. Console 110 may display data about managed endpoint machines, virtual agents which are running on the endpoint machines and proactive management policies which are applied to each machine. Console 110 may enable a user to create and embed in management unit 100 management and performance policies for the virtual agents. In some embodiments of the present invention, viewing, controlling, managing and/or any other kind of accessing into a virtual agent may be performed, for example, exclusively, by a user identified as an owner and/or any kind of administrator of the virtual agent.

Management unit 100 may detect all the machines across the data centers 140 and 150 in environment 15. Management unit 100 may collect and store in database 22 real-time information about statuses of endpoint machines, operating system used on each machine, virtual agents running on each machine, versions of virtual agents, and any other suitable data required for managing system 10 and the virtual agents.

In order to deploy virtual agents to endpoint machines, a user can select a virtual agent and push it to substantially any number of selected endpoint machines by commands via console 110. The virtual agent may then be executed on the selected machines as described herein and deliver all the functionality of the original agent, without actually being installed on the endpoint machine and without incurring excessive costs and waste of time associated with mass agent deployments on each machine separately. Additionally, via console 110, a user may schedule in advance specific time slots for virtual agents to be pushed to their endpoint machine automatically.

For virtual datacenters 140, pushing of virtual agents by core server 130 to endpoint machines may be performed whether the virtual endpoint machine is powered on or powered off. In case the virtual endpoint machine is powered off during the pushing of the virtual agent, the virtual agent is already included and may be executed in the endpoint machine once the machine is powered on.

In order to upgrade a version of a virtual agent a user may upload the selected version of the original agent installer files to management unit 100, which, as described above, may convert the original agent installer files to a virtual agent and may distribute the virtual file to core managers 130. Then, core manager 130 may push the virtual agent to all the relevant endpoint machines. The pushing may be done upon a command form a user via console 110. Reverting back to a previous version may be done in a similar manner.

Console 110 may display virtual agents applied to endpoint machines and non-virtual agents installed on the same endpoint machines. When a virtual agent is applied to an endpoint machine, the installed agent may be deactivated.

The virtual agent container may copy configurations from the installed agent to the container and/or the virtual agent may be executed with configurations of the installed agents. The non-virtual installed agent may not be removed from the machine and may be reactivated if desired. This side by side architecture of virtual and non-virtual agents may allow users to implement the use of system 10 gradually and with minimal risk.

Figure 4:
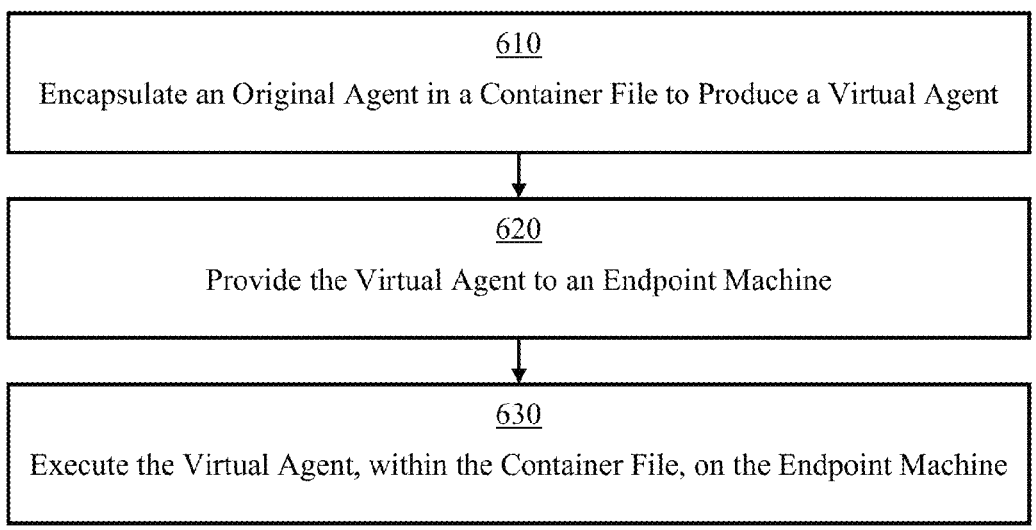
FIG. 4 is a schematic flowchart illustrating a method for datacenter environment management according to embodiments of the present invention It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

Reference is now made to FIG. 4, which is a schematic flowchart illustrating a method for datacenters environment management according to embodiments of the present invention. As indicated in block 610, the method may include encapsulating an original agent in a container to produce a virtual agent, for example according to embodiments of the present invention as described in detail herein. As indicated in block 620, the method may include providing the virtual agent to an endpoint machine, for example according to embodiments of the present invention as described in detail herein. As indicated in block 630, the method may include executing the virtual agent, within the container, on the endpoint machine, for example according to embodiments of the present invention as described in detail herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. For example, some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for providing consumers with codes for authorizing payment completion via mobile phone communications, it will now become apparent to one of skill in the art that other embodiments incorporating the concepts of the disclosure may be used.

What is claimed is:

1. A method of executing an original agent application on an endpoint machine as a virtual agent, the method comprising:
   encapsulating an original agent in a container to produce a virtual agent;
   providing the virtual agent to the endpoint machine;
   executing the virtual agent, within the container, on the endpoint machine,
   fully controlling the virtual agent within the container by creating, by a virtual operating system included in the container, a logical separation between the operating system of the endpoint machine and the virtual agent processes;
   intercepting a request directed to a local operating system made by the virtual agent;
   obtaining information from the local operating system and information from a virtual datacenter; and
   providing a response to the virtual agent based on information obtained from at least one of: the local operating system, an associated virtual datacenter and an underlying physical machine;
   wherein the container is configured to monitor an execution of the virtual agent, detect a malfunction related to an execution of the virtual agent and perform at least one action in connection with the malfunction.

2. The method of claim 1, wherein the container is configured to control an execution of the virtual agent and wherein controlling includes at least controlling resource usage by the virtual agent by throttling an execution of the virtual agent.

3. The method of claim 1, comprising:
   encapsulating a second agent in a respective second container to produce a second virtual agent;
   providing the second virtual agent to the endpoint machine;
   providing the second container with parameters extracted from the container; and
   based on the parameters, executing the second virtual agent, within the second container, on the endpoint machine.

4. The method of claim 1, wherein a service provided by the virtual agent and a service provided by the original agent are substantially the same.

5. The method of claim 1, wherein fully controlling the virtual agent within the container includes at least one of: encapsulating substantially all configurations related to the virtual agent into the container, monitoring, by the container, resources used by the virtual agent, intercepting, by the container, system requirements made by the virtual agent, and enforcing constraints on an execution of the virtual agent according to a policy.

6. The method of claim 1, wherein the endpoint machine is a virtual machine (VM) and wherein the container is configured to provide the virtual agent with information related to an underlying virtual infrastructure.

7. The method of claim 1, comprising controlling execution of the virtual agent based on real-time information received from an operating system executed on the endpoint machine.

8. The method of claim 1, comprising detecting an event of excessive resource consumption in an operating system executed on the endpoint machine and throttling an execution of the virtual agent to resolve the excessive resource consumption.

9. The method of claim 1, wherein providing the virtual agent to the endpoint machine is based on at least one of: a datacenter load, an I/O load, a target machine load and a virtual infrastructure load.

10. The method of claim 1, comprising:
   determining a resource consumption by the virtual agent; and
   providing, based on the determination, an estimated effect of execution of the virtual agent on the endpoint machine.

11. The method of claim 1, wherein the endpoint machine is a virtual machine (VM) and wherein providing the virtual agent to the endpoint machine includes providing the container through a hypervisor associated with the VM.

12. The method of claim 1, comprising automatically joining the virtual agent with a managed environment upon executing the virtual agent on an endpoint machine and automatically disjoining the virtual agent from the managed environment upon removing the endpoint machine from an installation in a datacenters environment.

13. The method of claim 1, comprising executing a plurality of virtual agents, within a respective plurality of containers, on the endpoint machine.

14. The method of claim 1, comprising executing a plurality of virtual agents, within a single container file, on the endpoint machine.

* * * * *